United States Patent [19]

Rock

[11] Patent Number: 4,724,251

[45] Date of Patent: Feb. 9, 1988

[54] POLYETHERIMIDE BEARING COMPOSITIONS

[75] Inventor: John A. Rock, Becket, Mass.

[73] Assignee: General Electric Co., Pittsfield, Mass.

[21] Appl. No.: 687,210

[22] Filed: Dec. 28, 1984

[51] Int. Cl.[4] .......................... C08F 8/00; C08L 83/00
[52] U.S. Cl. ..................................... 525/104; 525/180; 525/184; 252/12
[58] Field of Search ...................... 525/104, 180, 184; 252/12

[56] References Cited

U.S. PATENT DOCUMENTS

| | | | |
|---|---|---|---|
| 3,994,814 | 11/1976 | Cairns | 252/12 |
| 4,139,576 | 2/1979 | Yoshimura et al. | 525/180 |
| 4,433,104 | 2/1984 | Giles | 525/184 |
| 4,532,054 | 7/1985 | Johnson | 252/12 |

OTHER PUBLICATIONS

Modern Plastics Encyclopedia, Sep. 1965/vol. 43, No. 1A, pp. 244 and 245.

*Primary Examiner*—John C. Bleutge
*Assistant Examiner*—A. Carrillo
*Attorney, Agent, or Firm*—Bernard, Rothwell & Brown

[57] ABSTRACT

Nonmetallic bearing compositions contain a polyetherimide resin and, as a modifier, a fluoropolymer, such as polytetrafluoroethylene. The present compositions can be fabricated into a variety of shapes by injection molding, and have excellent wear resistance, load-bearing capabilities, and low coefficients of friction without the use of external lubrication.

10 Claims, No Drawings

POLYETHERIMIDE BEARING COMPOSITIONS

BACKGROUND OF THE INVENTION

The present invention relates to novel non-metallic bearing compositions. More particularly, the invention relates to polyetherimide-based non-metallic bearing compositions.

Virtually all machinery which contains moving parts utilizes bearings to reduce wear between stationary and moving components. The most common types of bearings are roller bearings, which employ balls or needles retained by a cage with an inner and outer race. These bearings are relatively complex, require considerable lubrication and are noisy. They are also relatively bulky and heavy, which precludes their use in certain applications.

Alternatives to roller bearings are journal bearings or bushings and thrust washers. When these types of bearings are made of metal, lubrication is required, and in the event of a loss of lubrication, failure is usually catastrophic. Also, start-up wear and noise levels can be high. Moreover, the relatively high weights of these bearings can be disadvantageous, particularly in transportation applications.

One approach to overcoming many of the foregoing problems has been to employ self-lubricating bearings. Presently, self-lubricating bearings are of two general types: plastics modified with various lubricants and fillers, and soft, porous metals (such as bronze, lead, and aluminum) impregnated with oil. Oil impregnated metallic bearings are effective, but they are also expensive and are difficult to form into the desired shape.

Self-lubricating plastic bearing compositions are finding increasing applications. Depending upon the performance requirements of the bearing, a wide variety of plastic materials and compositions can be employed for bearing fabrication. For example, in light applications, such as small appliances and toys, unmodified conventional plastic materials, such as polycarbonates, polyethylene, polyacetal and nylon have been employed. As performance requirements become more demanding, non-metallic bearing compositions have become more exotic. Presently, a wide variety of resin materials are modified with various fillers and reinforcements to provide greater wear resistance and load-bearing properties and to reduce friction. Nevertheless, the major applications for nonmetallic bearings have remained relatively low in performance requirements. Excellent bearing compositions have, however, been prepared from thermosetting and certain thermoplastic polyimide resins reinforced with glass fibers and containing certain lubricants. Typical compositions have load-bearing capacities approaching those of oil-impregnated metallic bearings. These compositions are available from Dupont, Wilmington, Del., U.S.A., under the trademark Vespel ®. These materials are relatively expensive and are not amenable to injection molding. Therefore, they must be machined to the desired shape, which contributes substantially to the cost of the finished product, and which also limits the possible physical configurations of the finished product.

It has recently been discovered that the use of fluoropolymers as modifiers in polyetherimide compositions results in high performance materials which can be easily fabricated using relatively simple injection molding techniques. U.S. patent application Ser. No. 626,728, filed July 2, 1984, now U.S. Pat. No. 4,532,054, describes such materials, in which the amount of fluoropolymer is most preferably about 15% by weight. The use of fluoropolymers, however, does inevitably cause some degradation of mechanical properties as a trade-off for greater wear resistance and lubrication. Hence, such compositions have heretofore also included reinforcements, such as glass or carbon fiber, as well as additional lubricants. While reinforcements improve some of the mechanical properties, their use is disadvantageous in certain applications, for example self-contact, where moving parts of a bearing having similar or identical composition are in contact with each other.

There is a continuing need, therefore, for bearing compositions which can be used in self-contact and other applications where reinforcements and fillers are prohibited. Such compositions should also possess mechanical properties approaching those of unmodified polyetherimides.

SUMMARY OF THE INVENTION

In accordance with the present invention, bearing compositions consist essentially of a polyetherimide resin as hereinafter defined and from about 8% to about 12% by weight of a fluoropolymer.

DETAILED DESCRIPTION OF THE INVENTION

The polyetherimides described herein are unique injection moldable thermoplastics, which are characterized by high impact strengths, high glass transition temperatures, and excellent processability. The nonmetallic bearing compositions of the present invention are novel polyetherimide composites which contain as modifiers, one or more fluoropolymers which provide wear resistance, load-bearing capacity and low coefficients of friction heretofore achieved only with metallic bearings, certain thermoset and thermoplastic polyimide resins or with fluoropolymer-containing compositions containing both reinforcements and lubricants.

The polyetherimides employed in the present invention include repeating groups of the formula:

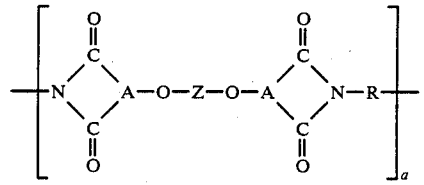

where "a" represents a whole number in excess of 1, e.g., 10 to 10,000 or more, the group —A—A< is selected from:

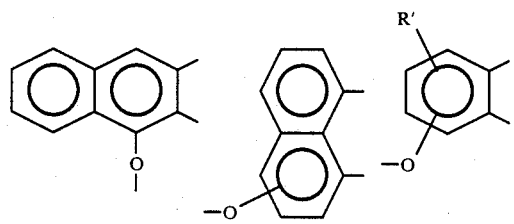

R' being hydrogen, lower alkyl or lower alkoxy, preferably the polyetherimide includes the latter —O—A< group where R' is hydrogen such that the polyetherimide is of the formula:

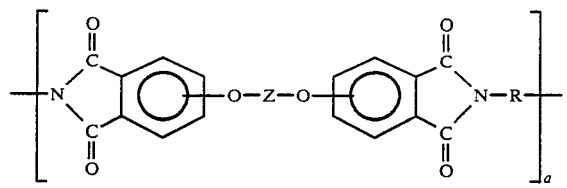

and the divalent bonds of the —O—Z—O-radical are in a 3,3'; 3,4'; 4,3' or the 4,4' position; Z is a member of the class consisting of (1)

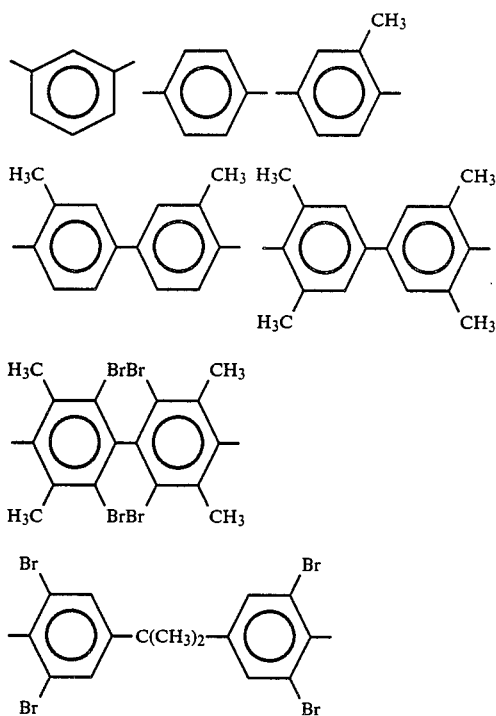

and (2) divalent organic radicals of the general formula:

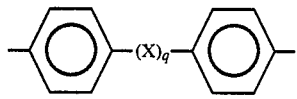

where X is a member selected from the class consisting of divalent radicals of the formulas,

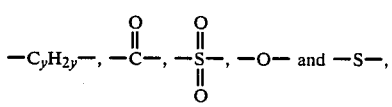

where q is 0 or 1, y is a whole number from 1 to 5, and R is a divalent organic radical selected from the class consisting of (1) aromatic hydrocarbon radicals having from 6-20 carbon atoms and halogenated derivatives thereof, (2) alkylene radicals and cycloalkylene radicals having from 2-20 carbon atoms, $C_{(2-8)}$ alkylene terminated polydiorganosiloxane, and (3) divalent radicals included by the formula

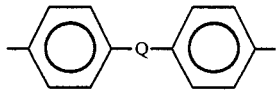

where Q is a member selected from the class consisting of

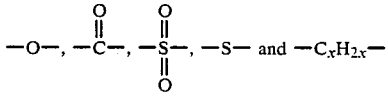

where x is a whole number from 1 to 5 inclusive. Particularly preferred polyetherimides for the purposes of the present invention include those where —O—A< and Z respectively are:

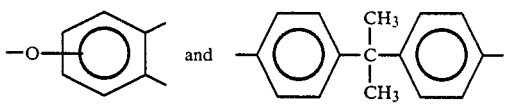

and R is selected from:

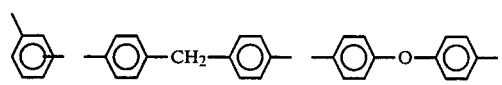

The polyetherimides where R is m-phenylene are most preferred.

In one embodiment of the present invention the polyetherimide may be a copolymer which, in addition to the etherimide units described above, further contains repeating units of the formula:

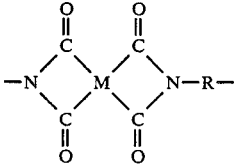

where R is as previously defined and M is selected from the group consisting of

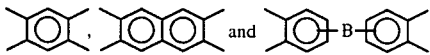

wherein B is —S— or

These polyetherimide copolymers are described by Williams et al., U.S. Pat. No. 3,983,093, incorporated herein by reference.

Preferred polyetherimides have glass transition temperatures exceeding about 200° C., and most preferably exceeding about 215° C. High operating temperatures are the primary causes of failure of nonmetallic bearings, and those materials which can withstand high temperatures without distorting or decomposing are preferred.

The polyetherimides can be obtained by any of the methods well known to those skilled in the art including the reaction of any aromatic bis(ether anhydrides) of the formula

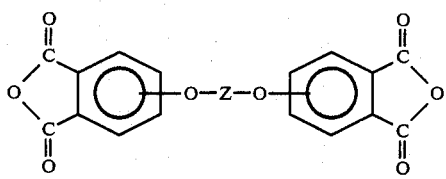

where Z is as defined hereinbefore with an organic diamine of the formula

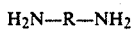

where R is as defined hereinbefore.

Aromatic bis(ether anhydride)s of the above formula include, for example, 2,2-bis[4-(2,3-dicarboxyphenoxy)phenyl]propane dianhydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)diphenyl sulfide dianhydride; 1,4-bis(2,3-dicarboxyphenoxy)benzene dianhydride; 4,4'-bis(2,3-dicarboxyphenoxy)benzophenone dianhydride; 4,4'-bis(2,3-dicarboxyphenoxy)diphenyl sulfone dianhydride; etc., 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 1,3-bis(3,4-dicarboxyphenoxy)benzene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4'-(3,4-dicarboxyphenoxy)diphenyl-2,2-propane dianhydride; etc., and mixtures of such dianhydrides.

In addition, aromatic bis(ether anhydride)s included by the above formula are shown by Koton, M. M.; Florinski, F. S.; Bessonov, M. I.; Rudakov, A. P. (Institute of Heteroorganic Compounds, Academy of Sciences, U.S.S.R.), U.S.S.R. 257,010, Nov. 11, 1969, Appl. May 3, 1967. Also, such dianhydrides are described by M. M. Koton, F. S. Florinski, Zh. Org. Khin, 4(5), 774 (1968).

Organic diamines of the above formula include, for example, m-phenylenediamine, p-phenylenediamine, 4,4'-diaminodiphenyl propane, 4,4'-diaminodiphenyl methane, benzidine, 4,4'-diaminodiphenyl sulfide, 4,4'-diaminodiphenyl sulfone, 4,4'-diaminodiphenyl ether, 1,5-diaminoaphthalene, 3,3'-dimethylbenzidine, 3,3'-dimethoxybenzidine, 2,4-bis(β-amino-t-butyl)toluene, bis(p-β-amino-t-butylphenyl)ether, bis(p-β-methyl-o-aminophenyl)benzene, 1,3-diamino-4-isopropylbenzene, 1,2-bis(3-aminopropoxy)ethane, m-xylylenediamine, p-xylylenediamine, 2,4-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylpropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis(3-aminopropyl)amine, hexamethylenediamine, heptamethylenediamine, nonamethylenediamine, decamethylenediamine, bis(3-aminopropyl)tetramethyldisiloxane, bis(4-aminobutyl)tetramethyldisiloxane, etc.

In general, the reactions advantageously can be carried out by employing well-known solvents, e.g., o-dichlorobenzene, m-cresol/toluene, etc., to effect interaction between the dianhydrides and the diamines, at temperatures of from about 100° to about 250° C. Alternatively, the polyetherimides can be prepared by melt polymerization of any of the aforementioned dianhydrides with any of the aforementioned diamine compounds while heating the mixture of the ingredients at elevated temperatures with concurrent intermixing. Generally, melt polymerization temperatures between about 200° to 400° C. and preferably 230° to 300° C. can be employed. Any order of addition of chain stoppers ordinarily employed in melt polymerization can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Generally, useful polyetherimides have an intrinsic viscosity [η] greater than 0.2 deciliters per gram, preferably 0.35 to 0.60, or 0.7 deciliters per gram or even higher when measured in m-cresol at 25° C.

Included among the many methods of making the polyetherimides are those disclosed in U.S. Pat. Nos. Heath et al., 3,847,867, Williams 3,847,869, Takekoshi et al. 3,850,885, White 3,852,242 and 3,855,178. These disclosures are incorporated herein in their entirety by reference for the purpose of teaching, by way of illustration, general and specific methods for preparing polyetherimides suitable for the composites of this invention.

Particularly preferred polyetherimides for the compositions of the present invention are represented by the formula

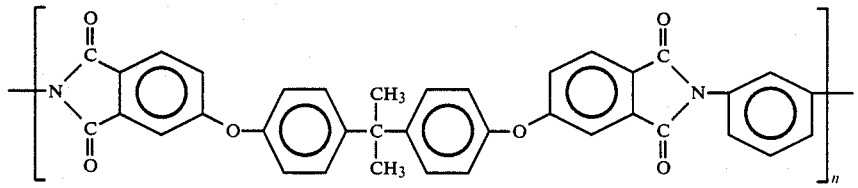

wherein "n" is an integer ranging from about 10 to about 100. This material is commercially available from General Electric Company, Pittsfield, Mass. under the registered trademark, ULTEM ®.

Although unmodified polyetherimide resins can be used for the fabrication of bearings for certain low performance applications, the characteristics of the material can be greatly improved by the addition of certain modifiers which serve to reduce the coefficient of friction between the bearing and the mating surface (e.g. a shaft) and to reduce the rate of wear of the bearing.

One type of material which serves both of these functions is a fluoropolymer, such as polytetrafluoroethylene ("PTFE"), fluorinated ethylene-propylene ("FEP"), and perfluoroalkoxy ("PFA"). These polymers are available commercially in powdered form and can conveniently be incorporated into the bearing compositions of the present invention. They are known for their ability to reduce friction between moving parts, and in the present compositions, they tend to reduce the wear rate not only of the nonmetallic bearing but also of the opposing surface, which can be metallic or of the same material as the bearing. The fluoropolymer employed in the present compositions is generally in powdered form, and has a particle size ranging from about 1 to about 25 microns, preferably from about 5 to about 10 microns. A particularly preferred fluoropolymer is PTFE which is available from Allied Chemical Corporation, Morristown, N.J. under the trademark Polymist ®F. The fluoropolymer is employed at a concentration of from about 8% to about 12% by weight.

It has unexpectedly been discovered that bearing compositions consisting essentially of a polyetherimide and a fluoropolymer at these concentrations, provides friction and wear reduction properties superior to similar compositions having lower and higher fluoropolymer concentrations. Without reinforcement, concentrations greater than about 12% by weight can have a deleterious effect on the strength and load bearing capacity of bearings fabricated from the composition. Preferred concentrations of fluoropolymer range from about 8% by weight to about 12% by weight, most preferably about 8% by weight to about 10% by weight of the composition. Because of the lower levels of fluoropolymer used, mechanical properties are not adversely affected to a degree which, in many applications, would normally require the use of reinforcing materials.

The bearing compositions of this invention have generally been found to have good wear resistance and load-bearing capacities, have a low coefficient of friction and produce very little wear on other moving parts. These compositions find particular utility in bearings which are self-contacting, that is, the mating surface is another bearing of similar composition. In such applications, reinforcers and fillers in the bearing compositions often have a detrimental effect on bearing performance.

The compositions can be prepared by any suitable blending technique which results in intimate mixing of the resin. This mixing advantageously can be accomplished in an extrusion apparatus which is maintained at a temperature higher than the glass transition temperature of the polyetherimide resin being employed, e.g., from about 250° to about 400° C. Generally, the pelletized or powdered resin material is mixed with the fluoropolymer and fed into the hopper of such an extrusion apparatus. The resin is melted in the extrusion apparatus and intimately mixed with the other components and is then extruded through a die, air cooled and chopped to form a pelletized bearing composition.

A particular advantage of the compositions of the present invention is that they can be injection molded to a variety of different shapes. Injection molding is considerably less expensive than machining and also permits greater flexibility in designing the shape of the finished product. These compositions can be molded into relatively thin-walled structures resulting in economies in not only raw material costs but also of space and weight. Perhaps more importantly, the thin-walled constructions result in greater heat dissipation, which can improve the performance of the bearing.

The characteristics of the various compositions of the present invention are generally determined by certain standardized tests. One of these tests measures the "PV limit" of a bearing material. In this test, a bearing (generally a thrust washer) is placed in contact with a polished steel surface and then rotated at a constant velocity. The force between the steel surface and the bearing is gradually increased in a stepwise manner, and conditions are allowed to stabilize after each step. The maximum force which results in no distortion of the bearing is multiplied times the velocity, and this figure is used as a measure of the allowable operating limits of the composition. Another test for these compositions is the wear rate. Again, a thrust washer fabricated from the composition being tested is mounted on a rotating holder and is pressed against a steel surface. The steel surface is mounted on an antifriction bearing equipped with a torque arm. Bearing temperature and friction torque are continuously monitored. After a break-in period (usually about 40 hours) the plastic washer is removed and weighed to four place accuracy. Subsequent wear is reported as milligrams per hour at specified speed and load.

The present invention is illustrated by the following examples, which are not intended to be limiting. "PV limits" "wear rates" and "coefficients of friction" are determined by the foregoing procedures. In addition, the condition of the steel surface (in examples 5-11) which engages the bearing was also noted as an indication of the abrasiveness of the bearing composition being tested.

EXAMPLES 1-4

A bearing composition consisting of polyetherimide and 10% by wt. polytetrafluoroethylene was prepared and tested for wear in self contact. The polyetherimide employed was ULTEM ® brand of polyetherimide obtained from General Electric Company, Pittsfield, Mass. U.S.A. The composition was prepared by melt blending the ingredients in an extrusion apparatus at a temperature of 350° C. The resulting composition was extruded, air-cooled and chopped into pellets. These pellets were then injection molded into ⅛ inch thick plaques. Samples for testing were machined from the plaques without modifying the molded testing surface. All samples were cleaned with hexane prior to testing. For the PV limit and wear rate tests, a thrust washer tester designated Falex No. 6 and manufactured by Faville-LaValley Corporation was employed. The sample thrust washer was machined to a size of 1⅛ inch outside diameter and a contact area of 0.46 in². The thrust washer was mounted on a rotating holder and pressed against a stationary thrust washer fabricated from identical material. The stationary thrust washer had an outside diameter of 1¼ inches and was mounted on a steel ring. The steel ring was mounted on an anti-friction bearing equipped with a torque arm. Bearing temperature and friction torque were continuously monitored. After break-in (about 40 hours), the plastic washer was removed and weighed to four place accuracy, and the thickness of the washer was measured at four positions according to ASTM procedure D3702. Using these arrangements as starting values, an extended wear test was run, at specified speed and load and, finally, the weight and thickness measurements were repeated. Wear occuring during this extended test was reported in milligrams per hour and the average thickness change times the contact area was used to calculate a volumetric wear rate. The volumetric wear rate was expressed as the "K factor," which is the volume of wear per hour divided by rubbing velocity in ft. per minute divided by the force in pounds (times $10^{-10}$). Wear rates for the stationary washer were also recorded. The wear rate tests were conducted at a PV (pressure times velocity) of 2000 psi×fpm (units are: pounds per sq. in.×feet per minute). A separate plastic specimen was used to determine the PV limit. At a sliding speed of 100 ft/min., load was increased in a stepwise manner and conditions were allowed to stabilize at each step. The point at which conditions would no longer stabilize or specimen collapse occurred was defined as the PV limit and was reported as the product of the speed and the highest pressure achieved. The results of these tests are reported in Table 1 below, in which the entry for Example 1 refers to the composition consisting of polyetherimide and 10% by wt. polytetrafluoroethylene. For comparisons, test specimens fabricated from three other polyetherimide compositions were prepared and tested by the same procedure. In Example 2, the test specimens were made of unmodified polyetherimide. In Example 3, the test specimens were made of polyetherimide reinforced with glass fibers. This material contained 30% fiberglass. In Example 4, the test specimens were made of a polyetherimide bearing composition containing 25% fiberglass, 2.5% molybdenum sulfide containing solid lubricant (Lubolid ®-Dow Chemical), 10% graphite and 15% polytetrafluoroethylene. These data demonstrate superior wear rates and PV limits for the bearing compositions of the present invention.

EXAMPLES 5-11

The experiments of Examples 1-4 were repeated in all essential details, except that a dry, cold rolled carbon steel wear ring with specified hardness and finish was substituted for the plastic stationary thrust washer. Two separate studies were performed in which samples of polyetherimide (ULTEM ®) resin containing varying amounts of polytetrafluoroethylene were prepared and tested. The studies differed as to the range of PTFE levels included and in the intrinsic viscosity of the polyetherimide resin used. The first study involved compositions containing 10%, 15%, and 20% by wt. fluoropolymer. Unexpectedly, superior bearing performance was exhibited by the specimens containing the lower PTFE concentrations. Particularly, Example 5 (10% by wt. PTFE) in Table 2 shows the lowest wear rate (K factor), dynamic coefficient of friction, and steel wear and the highest PV limit of the three composites. The further group of experiments (Examples 8-11, Table 3) involved a narrower span of fluoropolymer concentrations (6, 8, 10, & 12% by wt.) and served to define the optimum bearing performance compositions, with wear rate rising dramatically below about 8% by wt. PTFE and increasing, less rapidly, at concentrations above this level. Table 3 also shows that the dynamic coefficient of friction remained low and no steel wear occurred in Examples 9-11 (8% to 12% by wt. fluoropolymer). While the range of compositions of the present invention at once exhibit superior bearing performance, their optimal character is further demonstrated by the fact that other properties (Table 4) deteriorate, relative to unmodified polyetherimide resin (Table 4-"control"), with increasing levels of fluoropolymer addition.

TABLE 1

| Example No. | Wear (mg/hr) | K Factor (× $10^{-10}$ in³-min/ft/lb/hr) | Bottom Specimen Wear (mg/hr) | PV Limit (@ 100 ft/min) |
|---|---|---|---|---|
| 1 | 0.09 | 27 | 0.16 | 8600 |
| 2 | 107.5 | — | 267 | <2000 |
| 3 | 262.1 | — | 212 | <2000 |
| 4 | 5.6 | 1928 | 5.5 | <2000 |

TABLE 2

| Example No. | PFTE (Wt. %) | K Factor | Dynamic Coeff. of Friction (Avg) | Steel Wear (mg/hr) | PV Limit (@ 100 ft/min) |
|---|---|---|---|---|---|
| 5 | 10 | 110 | 0.22 | 0 | 82,000 |
| 6 | 15 | 130 | 0.27 | 0.008 | 66,000 |
| 7 | 20 | 200 | 0.29 | 0.004 | 60,000 |

TABLE 3

| Example No. | PTFE (Wt. %) | K Factor | Dynamic Coefficient of Friction (Avg) | Steel Wear (mg/hr) |
|---|---|---|---|---|
| 8 | 6 | 1000 | 0.22 | 0 |
| 9 | 8 | 60 | 0.21 | 0 |
| 10 | 10 | 170 | 0.21 | 0 |
| 11 | 12 | 190 | 0.21 | 0 |

TABLE 4

| Example No. | PTFE (Wt. %) | Tensile Strength (psi) | Elong. | Flexural Mod (× $10^3$ psi) | Flexural Str. (psi) | Reverse Notched Impact (ft-lb/in) |
|---|---|---|---|---|---|---|
| Control | 0 | 15,200 | 60. | 480 | 21,000 | 25 |
| 8 | 6 | 14,500 | 12.7 | 443 | 20,300 | >15.8 |
| 5 | 10 | 14,200 | 13.2 | 421 | 20,100 | 11.8 |
| 6 | 15 | 13,400 | 9.5 | 408 | 19,400 | 8.0 |
| 7 | 20 | 12,400 | 8.4 | 388 | 18,000 | 6.7 |
| Test Method (ASTM) | | D638 | | D790 | | D256 |

What is claimed is:

1. A bearing formed from a composition consisting essentially of a polyetherimide resin containing repeating units of the formula:

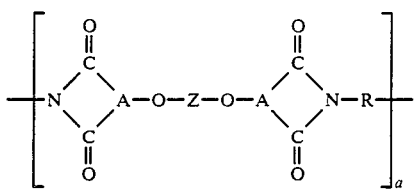

and from about 8% to about 12% by weight of a fluoropolymer, wherein "a" represents a whole number from about 10 to about 10,000, the group —O—A< is selected from:

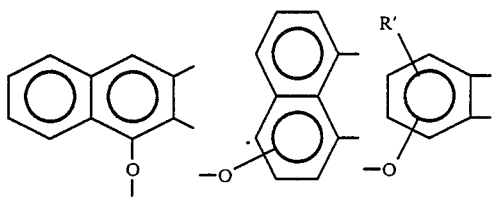

wherein R' is hydrogen, lower alkyl or lower alkoxy; Z is a member of the class consisting of (1)

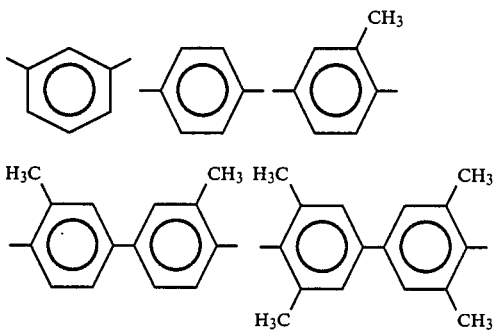

and (2) divalent organic radicals of the general formula

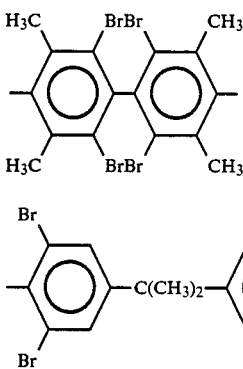

where X is a member selected from the class consisting of divalent radicals of the formula:

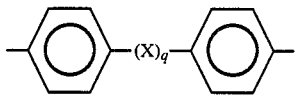

where q is 0 or 1, y is a whole number from 1 to 5 and R is a divalent organic radical selected from the class consisting of (1) aromatic hydrocarbon radicals having from 6 to 20 carbon atoms and halogenated derivatives thereof, (2) alkylene radicals and cycloalkylene radicals having from 2-20 carbon atoms, $C_{(2-8)}$ alkylene terminated polydiorganosiloxane, and (3) divalent radicals of the formula

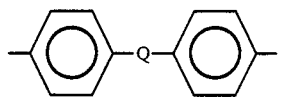

where Q is a member selected from the class consisting of

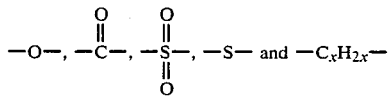

where x is a whole number from 1 to 5 inclusive.

2. The bearing of claim 1, wherein the group —O—A< is

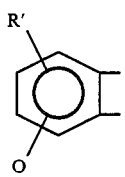

3. The bearing of claim 1 wherein said polyetherimide further contains repeating units of the formula

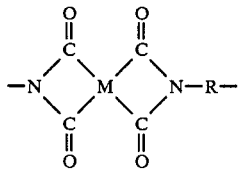

where R is as previously defined and M is selected from the group consisting of

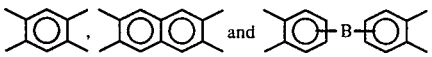

wherein B is —S— or

4. The bearing of claim 2, wherein Z is

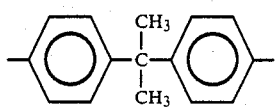

and R is

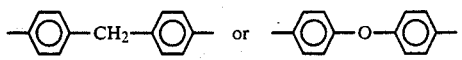

5. The bearing of claim 1, wherein the polyetherimide resin has the formula

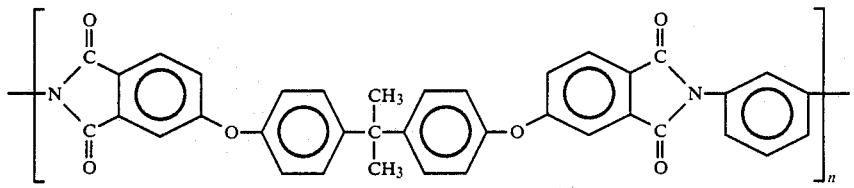

wherein n is an integer from 10 to about 100.

6. The bearing of claim 1, 2, 3, 4, or 5 wherein the polyetherimide resin has a glass transition temperature of at least about 200° C., and the fluoropolymer is selected from polytetrafluoroethylene, fluorinated ethylene-propylene, perfluoroalkoxy, and combinations thereof.

7. The bearing of claim 6, wherein the fluoropolymer has a particle size of from about 1 to about 25 microns, and is present in a concentration of from about 8% by weight to about 12% by weight of the composition.

8. The bearing of claim 6, wherein the polyetherimide resin has a glass transition temperature of at least about 215° C.

9. The bearing of claim 8, wherein the fluoropolymer is polytetrafluoroethylene having a particle size of from about 5 to about 10 microns and is present at a concentration of about 10% by weight of the composition.

10. A method for forming a nonmetallic bearing which comprises injection molding the composition of claim 8 to the desired shape.

* * * * *

UNITED STATES PATENT AND TRADEMARK OFFICE
CERTIFICATE OF CORRECTION

PATENT NO. : 4,724,251

DATED : Feb. 9, 1988

INVENTOR(S) : Rock

It is certified that error appears in the above-identified patent and that said Letters Patent is hereby corrected as shown below:

Col. 2, line 54, "-A-A$\lessdot$" should be "-O-A$\lessdot$"

Signed and Sealed this

Twenty-seventh Day of September, 1988

Attest:

DONALD J. QUIGG

*Attesting Officer*     *Commissioner of Patents and Trademarks*